United States Patent
Yao et al.

(10) Patent No.: US 11,507,286 B2
(45) Date of Patent: Nov. 22, 2022

(54) PERFORMING STORAGE PROVISION OPERATIONS ON A FILE SYSTEM

(71) Applicant: EMC IP Holding Company LLC, Hopkinton, MA (US)

(72) Inventors: Sicong Yao, Shanghai (CN); Liang Huang, Shanghai (CN); Ruipeng Yang, Shanghai (CN); Jianhua Shao, Shanghai (CN); Xianlong Liu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/323,268

(22) Filed: May 18, 2021

(65) Prior Publication Data
US 2022/0236897 A1   Jul. 28, 2022

(30) Foreign Application Priority Data
Jan. 22, 2021   (CN) ......................... 202110089226.3

(51) Int. Cl.
*G06F 3/06*   (2006.01)
*G06F 16/11*   (2019.01)
*G06N 20/00*   (2019.01)

(52) U.S. Cl.
CPC .......... *G06F 3/0631* (2013.01); *G06F 3/0604* (2013.01); *G06F 3/0659* (2013.01); *G06F 3/0673* (2013.01); *G06F 16/11* (2019.01); *G06N 20/00* (2019.01)

(58) Field of Classification Search
CPC .... G06F 3/0631; G06F 3/0604; G06F 3/0659; G06F 3/0673; G06F 16/11; G06N 20/00
See application file for complete search history.

(56) References Cited

U.S. PATENT DOCUMENTS

| | | | |
|---|---|---|---|
| 8,156,306 B1 | 4/2012 | Raizen et al. | |
| 10,452,441 B1* | 10/2019 | Subramanian | ........ G06F 9/5005 |
| 10,657,066 B2 | 5/2020 | Han et al. | |
| 11,093,389 B2 | 8/2021 | Ding | |
| 11,356,384 B1* | 6/2022 | Desai | .................. G06F 11/3006 |
| 2011/0185140 A1* | 7/2011 | Arakawa | ................. G06F 3/067 |
| | | | 710/33 |
| 2012/0233432 A1* | 9/2012 | Feldman | ................ G11B 5/012 |
| | | | 711/170 |

(Continued)

*Primary Examiner* — Sean D Rossiter
(74) *Attorney, Agent, or Firm* — BainwoodHuang

(57) ABSTRACT

A storage management technique involves: determining a spare degree of physical storage space of a file system and access characteristics of the file system; determining, using a provision operation classification model and based on the spare degree and the access characteristics, a target storage provision operation to be performed for the file system from multiple storage provision operations, wherein the multiple storage provision operations include at least a storage space expansion operation and a storage space reclamation operation, and the provision operation classification model characterizes an association relationship between different spare degrees and different access characteristics of the file system and the multiple storage provision operations; and performing the determined target storage provision operation for the file system. Accordingly, a better balance is achieved between storage efficiency and I/O performance.

31 Claims, 6 Drawing Sheets

(56) References Cited

U.S. PATENT DOCUMENTS

| | | | |
|---|---|---|---|
| 2013/0080688 A1* | 3/2013 | Park | G06F 3/0659 |
| | | | 711/E12.008 |
| 2021/0216505 A1 | 7/2021 | Zhao et al. | |
| 2021/0312377 A1* | 10/2021 | Wessela | G06Q 10/04 |
| 2021/0374047 A1* | 12/2021 | Lie | G06F 16/90335 |

* cited by examiner

PERFORMING STORAGE PROVISION OPERATIONS ON A FILE SYSTEM

CROSS-REFERENCE TO RELATED APPLICATION

This application claims priority to Chinese Patent Application No. CN202110089226.3, on file at the China National Intellectual Property Administration (CNIPA), having a filing date of Jan. 22, 2021, and having "STORAGE MANAGEMENT METHOD, DEVICE, AND COMPUTER PROGRAM PRODUCT" as a title, the contents and teachings of which are herein incorporated by reference in their entirety.

TECHNICAL FIELD

Embodiments of the present disclosure generally relate to storage systems, and more particularly, to a method, an electronic device, and a computer program product for storage management.

BACKGROUND

Thin provision storage configurations are widely used because of their ability to use storage space efficiently. In a storage system with a thin provision storage configuration, one or more file systems are created based on a physical storage device with a certain storage capacity, wherein the total size of the virtual storage space configured for the created file systems can be greater than the storage capacity of the physical storage device.

The thin provision storage configuration facilitates the expansion of physical storage space according to the demand of a user of the file system for the storage capacity without further modification of settings of the file system. Specifically, when a file system is created, a small physical storage space that is smaller than the configured storage space may be allocated to the file system. As new data is stored into the file system, more storage space is expanded for the file system. Meanwhile, as data is deleted from the file system, the allocated storage space is released, and spare storage space of the file system can also be reclaimed into a storage pool.

When managing the file system, the decision of whether to expand or reclaim the storage space of the file system affects the space usage efficiency of the storage pool and access performance of the file system. It is expected to apply a better solution to determine expansion or reclamation of the storage space of the file system.

SUMMARY OF THE INVENTION

The embodiments of the present disclosure relate to a solution for storage management.

In a first aspect of the present disclosure, a method for storage management is provided. The method includes: determining a spare degree of physical storage space of a file system and access characteristics of the file system; determining, using a provision operation classification model and based on the spare degree and the access characteristics, a target storage provision operation to be performed for the file system from multiple storage provision operations, wherein the multiple storage provision operations include at least a storage space expansion operation and a storage space reclamation operation, and the provision operation classification model characterizes an association relationship between different spare degrees and different access characteristics of the file system and the multiple storage provision operations; and performing the determined target storage provision operation for the file system.

In a second aspect of the present disclosure, an electronic device is provided. The electronic device includes at least one processor and at least one memory storing computer program instructions. The at least one memory and the computer program instructions are configured to cause, along with the at least one processor, the electronic device to perform actions. The actions include: determining a spare degree of physical storage space of a file system and access characteristics of the file system; determining, using a provision operation classification model and based on the spare degree and the access characteristics, a target storage provision operation to be performed for the file system from multiple storage provision operations, wherein the multiple storage provision operations include at least a storage space expansion operation and a storage space reclamation operation, and the provision operation classification model characterizes an association relationship between different spare degrees and different access characteristics of the file system and the multiple storage provision operations; and performing the determined target storage provision operation for the file system.

In a third aspect of the present disclosure, a computer program product is provided. The computer program product is tangibly stored on a computer-readable storage medium and includes computer-executable instructions that, when executed by a processor of a device, cause the device to perform the method of the first aspect.

It should be understood that the content described in the Summary of the Invention section is neither intended to limit key or essential features of the embodiments of the present disclosure, nor intended to limit the scope of the present disclosure. Other features of the present disclosure will become readily understandable through the following description.

BRIEF DESCRIPTION OF THE DRAWINGS

The above and other objectives, features, and advantages of the embodiments of the present disclosure will become easily understandable by reading the following detailed description with reference to the accompanying drawings. In the accompanying drawings, several embodiments of the present disclosure are shown by way of example instead of limitation, where.

Throughout all the accompanying drawings, the same or similar reference numerals are used to indicate the same or similar components.

DETAILED DESCRIPTION

Figure 1:
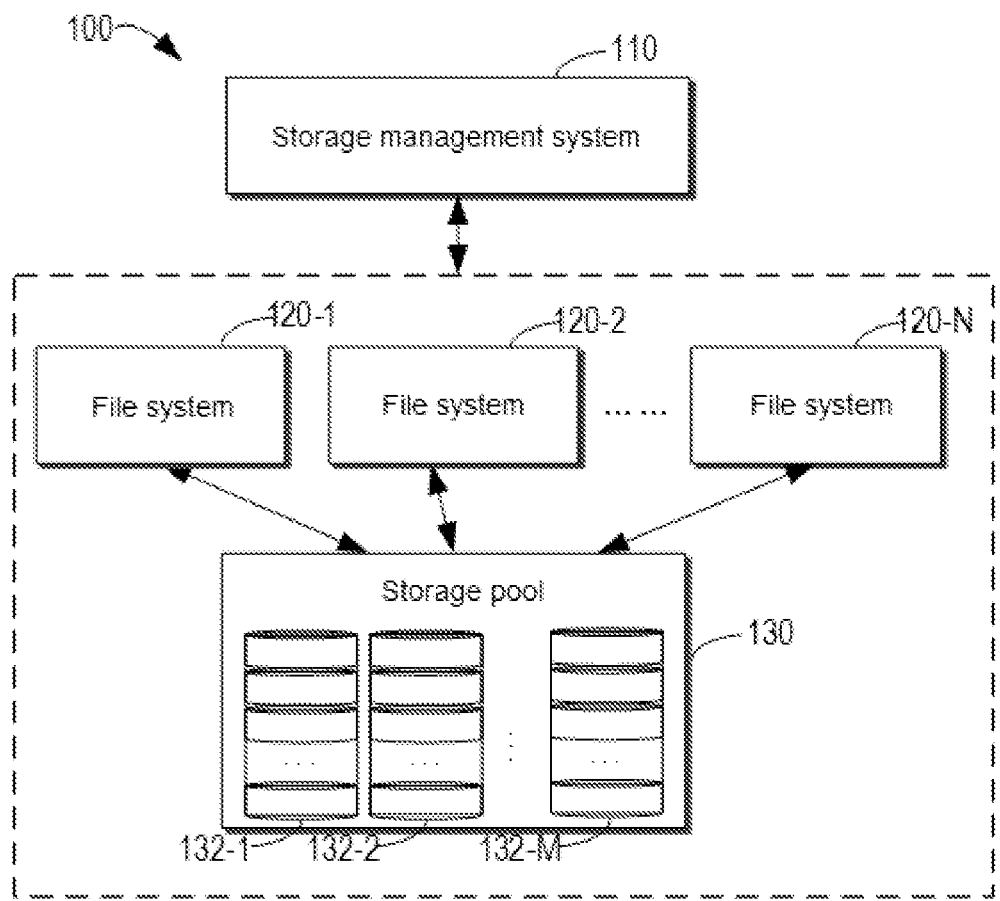
FIG. 1 illustrates a block diagram of an example storage system in which embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles and spirits of the present disclosure will be described below with reference to several example embodiments shown in the accompanying drawings. It should be understood that these specific embodiments are described only for the purpose of enabling a person skilled in the art to better understand and then implement the present disclosure, instead of limiting the scope of the present disclosure in any way.

As used herein, the term "machine learning" refers to processing involving high-performance computing, machine learning, and artificial intelligence algorithms. Herein, the term "machine learning model" may also be referred to as a "learning model," "learning network," "network model," or "model." A "neural network" or "neural network model" is a deep learning model. To summarize, a machine learning model is capable of receiving input data, performing predictions based on the input data, and outputting prediction results.

A machine learning model may include multiple processing layers, each processing layer having multiple processing units. The processing units are sometimes also referred to as convolution kernels. In a convolution layer of a convolution neural network (CNN), processing units are referred to as convolution kernels or convolution filters. Processing units in each processing layer perform corresponding changes on inputs of that processing layer based on corresponding parameters. An output of the processing layer is provided as an input to the next processing layer. An input to the first processing layer of the machine learning model is a model input to the machine learning model, and an output of the last processing layer is a model output of the machine learning model. Inputs to the intermediate processing layers are sometimes also referred to as features extracted by the machine learning model. Values of all parameters of the processing units of the machine learning model form a set of parameter values of the machine learning model.

Machine learning can mainly be divided into three phases, namely, a training phase, a testing phase, and an application phase (also referred to as an inference phase). During the training phase, a given machine learning model can be trained using a large number of training samples and iterated continuously until the machine learning model is able to learn the desired target from the training samples. Through training, the machine learning model may be considered as being capable of learning mapping or association relationships between inputs and outputs from training data. After training, a set of parameter values of the machine learning model is determined. In the testing phase, the trained machine learning model may be tested by using a test sample to determine the performance of the machine learning model. In the application phase, the machine learning model can be used to process, based on the set of parameter values obtained from the training, actual input data to provide corresponding outputs.

FIG. 1 illustrates a schematic diagram of example storage system 100 in which embodiments of the present disclosure can be implemented. As shown in FIG. 1, storage system 100 includes storage pool 130, one or more file systems 120-1, 120-2, . . . , and 120-N (N is an integer greater than or equal to 1) created based on storage pool 130, and storage management system 110. For ease of discussion, file systems 120-1, 120-2, . . . , and 120-N are sometimes referred to collectively or separately as file system 120.

File system 120 can be exposed to a user for data access (e.g., input/output (I/O) access). Storage pool 130 includes one or more storage devices 132-1, 132-2, . . . , 132-M (M is an integer greater than or equal to 1), etc., for providing physical storage space of file system 120. For ease of discussion, storage devices 132-1, 132-2, . . . , and 132-M are sometimes referred to collectively or separately as storage device 132.

Storage device 132 may include various types of devices having a storage function, including but not limited to a hard disk drive (HDD), a solid state disk (SSD), a removable disk, a compact disk (CD), a laser disk, an optical disk, a digital versatile disk (DVD), a floppy disk, a Blu-ray disk, a serial-attached small computer system Interface (SCSI) disk (SAS), a serial advanced technology attachment (SATA) disk, any other magnetic storage device and any other optical storage device, or any combination thereof. Storage management system 110 is configured to control and manage storage pool 130, including storage space allocation, data access, data reconstruction, data backup, etc., for storage pool 130.

File system 120 can be created based on a dynamic storage space allocation approach. For example, file system 120 can be created based on a thin provision storage configuration. Based on the thin provision storage configuration, the physical storage space provided for file system 120 can be expanded or reduced according to the actual demand of the user of file system 120 for storage space without further modification of settings of the file system.

Thus, based on the thin provision storage configuration, the total size of the virtual storage space configured for file system 120 can be greater than the physical storage space of storage pool 130. For example, on the basis of a storage pool with a storage capacity of 10 TB, a file system configured with a virtual storage space of 10 TB and another file system configured with a virtual storage space of 5 TB can be created according to the thin provision storage. These two file systems acquire storage space from the storage pool based on storage demands. Each file system 120 is allowed to use the maximum amount of the virtual storage space configured for it.

Generally, when file system 120 is created, a small physical storage space that is smaller than the configured storage space may be allocated to file system 120 first. As new data is stored into the file system, more storage space is expanded for the file system. Meanwhile, as data is deleted from the file system, the allocated storage space is released, and spare storage space of the file system can also be reclaimed into the storage pool. Such dynamic storage space expansion and reclamation facilitates efficient use of the physical storage space of storage pool 130, as it is not necessary to allocate all storage resources required by certain file system 120 from storage pool 130, so that spare storage space can be allocated for use by attempted file system 120.

It should be understood that FIG. 1 only schematically illustrates units, modules, or components in storage system 100 that are related to the embodiments of the present disclosure. The various components illustrated in FIG. 1 are only one example storage system management architecture, and there may be other architectural division approaches, other units, modules, or components for other functions, and so forth. Therefore, embodiments of the present disclosure are not limited to the specific devices, units, modules, or components depicted in FIG. 1, but are generally applicable to any storage system based on RAID technologies. The various components (other than storage device 132) illustrated in FIG. 1 can be implemented in a single or multiple computing systems.

Expansion or reclamation of storage space of a file system is a problem of trade-off. Expansion of storage space means allocating more physical storage space (e.g., from a storage pool) to the file system, and reclamation of storage space means deallocating some of the storage space (spare storage space) of the file system.

Generally, the I/O performance of the file system can be improved if more storage space is allocated to the file system. The inventor found that the reason for this lies in that as writing, deletion, and overwriting are performed on the file system, the spare storage space of the file system will become fragmented. If writing is performed on non-continuous spare storage areas, the I/O performance will degrade. In particular, the impact of storage space fragmentation on the I/O performance is more obvious if the back-end storage pool is based on mixed types of storage devices and the storage devices include HDDs. This is because the I/O performance of HDDs is more sensitive to the sequential write capability of the file system. If the file system is capable of getting more spare storage space from the storage pool, the files to be written can be written into continuous storage space, thus obtaining better I/O performance.

In another aspect, if more storage space is allocated for a particular file system, the utilization efficiency of the physical storage space of the file system may decrease. In addition, less storage space is available to other file systems. Especially in systems based on over-allocated thin provisioning storage configurations, some file systems may not get the pre-configured storage space.

Therefore, there is a trade-off between providing storage space for a file system to improve I/O performance and reserving spare storage space in a storage pool for storage space efficiency reasons.

At present, expansion or reclamation of storage space of a file system is implemented based on thresholds. In short, when spare storage space of a file system is less than a low watermark (LWM), the storage space of the file system is to be expanded, while when the storage space of the file system is greater than a high watermark (HWM), a reclamation operation is to be performed on the storage space of the file system.

However, the inventor found that threshold-based expansion and reclamation decisions are weakly adaptable to file size. Typically the LWM and the HWM can be defined on a percentage basis. For example, the LWM can be defined as 25% and the HWM can be defined as 30%. Based on such LWM and HWM, for a file system that has been allocated 100 GB of space, when the spare space is less than 25 GB, expansion of storage space can be performed on the file system. When the spare space exceeds 30 GB, reclamation of space to the storage pool can start. However, for a file system allocated with 1 TB of space, the absolute spare space that triggers storage space expansion will become 250 GB, while the corresponding spare space that triggers storage space reclamation is 300 GB. This will lead to excessive investment of the storage pool in terms of storage space provision, thus causing the space efficiency of the thin provision storage configuration to decrease.

The inventor also found through research that, in another aspect, the threshold-based expansion and reclamation decisions are difficult to adapt to the I/O performance requirements of different file systems. Thresholds like LWM and HWM are only sensitive to the storage space of the file system without considering other factors. Although different LWMs and HWMs can be configured for different file systems, appropriate LWM and HWM can only be achieved by expertise knowledge and in-depth study of the file system. In addition, specific applications of the file system may change, and then the I/O performance requirements may also change.

Therefore, an improved solution is needed to determine how to perform storage space expansion and reclamation for a file system, so as to achieve a better balance between storage efficiency and I/O performance.

According to an example embodiment of the present disclosure, an improved solution for storage management is proposed. According to this solution, a provision operation classification model is used to characterize (or represent/describe/etc.) an association relationship between different spare degrees of storage space and different access characteristics of a file system and multiple storage provision operations. For a certain file system, with the provision operation classification model, a target storage provision operation to be performed for the file system is determined from the multiple storage provision operations based on the spare degree of the storage space of the file system and by determining the access characteristics of the file system.

By comprehensively considering the spare storage space of the file system and the information related to the access characteristics, a storage provision operation suitable for the current storage space and access status of the file system, such as expanding storage space or reclaiming storage space, is estimated. In this way, it is possible to optimize the physical storage space allocated to the file system and still meet the access demand for the file system, thus achieving a better balance between storage efficiency and I/O performance.

Example embodiments of the present disclosure will be discussed in more detail below in connection with the accompanying drawings.

Figure 2:
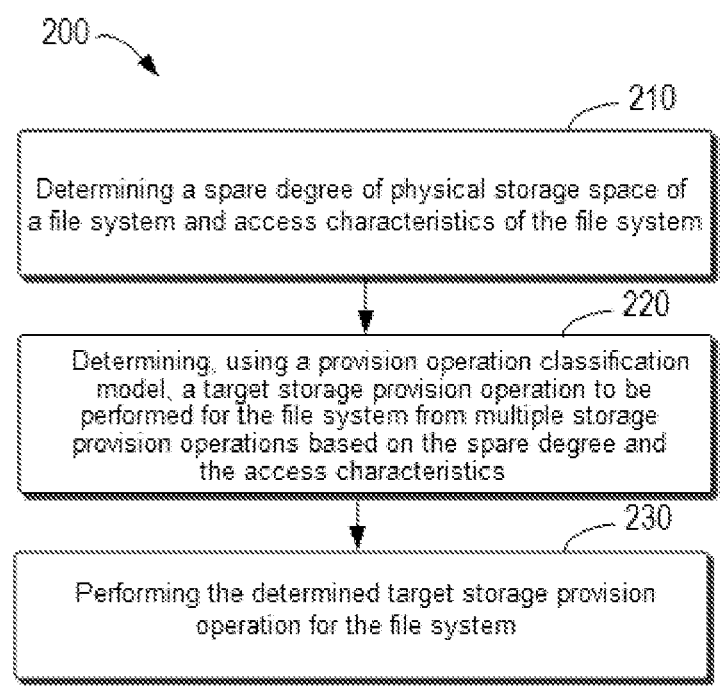
FIG. 2 illustrates a flow chart of a method for storage management according to some embodiments of the present disclosure.

FIG. 2 illustrates a flow chart of method 200 for storage management according to embodiments of the present disclosure. In some embodiments, method 200 can be implemented at storage management system 110. For ease of description, method 200 will be described below with reference to FIG. 1.

At block 210, storage management system 110 determines a spare degree of physical storage space of file system 120 and access characteristics of file system 120. File system 120 may be any file system created based on storage pool 130. The physical storage space of file system 120 refers to an actual storage capacity provided for file system 120. In a thin provision-based storage system, the physical storage space provided for file system 120 can vary dynamically, and may be less than or equal to the virtual storage space configured for file system 120.

In example embodiments of the present disclosure, it is expected to consider factors of multiple aspects of file system 120 to determine how to better provide storage space for file system 120 from storage pool 130. These factors include factors involving spare storage space of file system 120 (e.g., the spare degree) and factors related to access to file system 120 (e.g., access characteristics). Here, access to file system 120 refers to I/O operations for file system 120. By considering access-related factors, appropriate storage space provision can be determined based on the access pressure, performance degradation, user behaviors, etc. of the file system to ensure the I/O performance of the file system.

In some embodiments, when determining the spare degree, storage management system 110 can determine the total size of storage space allocated for file system 120 and the size of spare storage space, and determine a spare space proportion (SSP) based on the total size of the allocated physical storage space and the size of the spare storage space. In some examples, the total size of the allocated storage space can be indicated by the sum of the number of allocation units (AUs) that file system 120 has allocated for storing data and the number of spare AUs, wherein each allocation unit has a predetermined size. Accordingly, the size of the spare storage space is indicated by the number of spare AUs. In this way, the spare space SSP proportion can be determined as follows:

$$SSP = \frac{\text{Number of spare } AUs}{\text{Number of allocated } AUs + \text{Number of spare } AUs} \quad (1)$$

In some examples, the total size of the allocated physical storage space of file system 120 and the size of the spare storage space can also be indicated by other indexes, which are not limited here. In some embodiments, in addition to the spare space proportion SSP expressed as a percentage or alternatively, the spare degree of file system 120 can also be expressed in other ways, for example, a particular spare level that can be mapped to multiple discrete spare levels. As will be discussed below, the spare degree will be used as an input to the provision operation classification model for predicting a target storage provision operation, and thus each discrete spare level may correspond to a different discrete value for subsequent processing.

In some embodiments, the access characteristics to be considered for the prediction of a storage provision operation of file system 120 may include the sequential write capability of file system 120, as the storage space allocation of file system 120 will affect the sequential write capability of file system 120, and in turn affects the I/O performance of the file system.

In some embodiments, the sequential write capability of file system 120 can be measured by the fragmentation ratio (FR) of file system 120. Specifically, the fragmentation ratio FR can be determined as a ratio of the total number (sometimes referred to as a "first number") of storage units in the physical storage space of file system 120 that are used for sequential writing to the number (sometimes referred to as a "second number") of storage units in which data is partially written among the storage units that are used for sequential writing. For example, the fragmentation ratio FR can be determined as follows:

$$FR = \frac{\text{Number of storage units in which data is partially written}}{\text{Total number of storage units for sequential writing}} \quad (2)$$

A storage unit for sequential writing refers to continuous storage sections that can be used to provide sequential writing. Such storage unit is sometimes also referred to as a "storage window" or "window." Such storage unit may include multiple AUs. A storage unit in which data is partially written refers to a storage unit in part of which data is written and the other part is still spare, also known as a partially spare storage unit.

If data is written into a completely spare storage unit, sequential I/O accesses to the actual physical storage space can be achieved, which can significantly improve the I/O performance. Otherwise, if data is written into part of such storage unit, writing into the spare part of the storage unit will result in non-sequential I/O accesses, which degrades the I/O performance.

Figure 3:
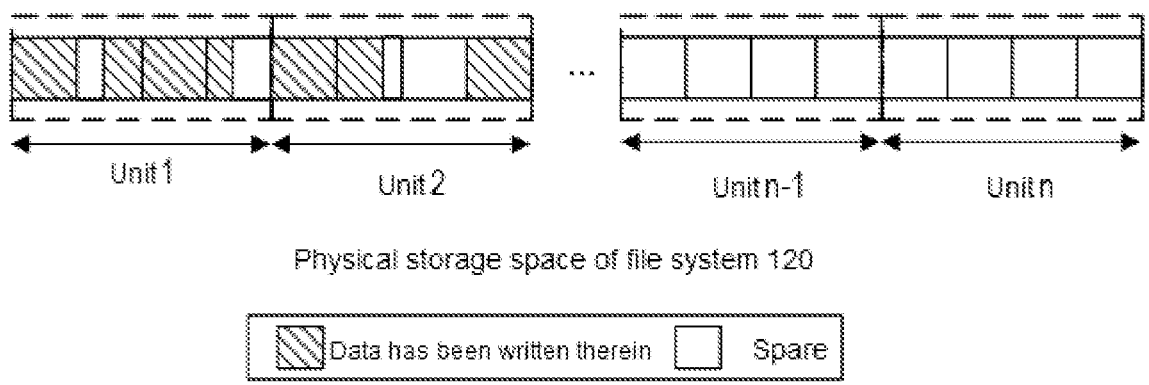
FIG. 3 illustrates an example of storage units for sequential writing in a file system according to some embodiments of the present disclosure.

FIG. 3 illustrates an example of storage units for sequential writing in file system 120 according to some embodiments of the present disclosure. FIG. 3 shows that the physical storage space of file system 120 includes n storage units for sequential writing, including unit 1, unit 2, ..., unit n-1, unit n. Each storage unit is illustrated as including 4 AUs. In these storage units, data is written into part of AUs of unit 1 and unit 2, and there is partially spare space; all AUs of unit n-1 and unit n are spare. Therefore, unit 1 and unit 2 are storage units in which data is partially written.

The proportion of storage units in which data is partially written to all storage units for sequential writing can be determined with the fragmentation ratio FR. The larger the proportion of the number of storage units in which data is partially written, the larger the fragmentation ratio FR, then the lower the sequential write capability of file system 120. In this case, the tendency is to expand the physical storage space of file system 120 in order to obtain more completely spare storage units to indicate subsequent write operations. Conversely, the smaller the proportion of the number of storage units in which data is partially written, the larger the fragmentation ratio FR, then the stronger the sequential write capability of file system 120.

It should be understood that, in addition to the fragmentation ratio FR or alternatively, the sequential write capability of file system 120 can also be measured in other ways.

In some embodiments, additionally or alternatively, the access characteristics of file system 120 may also include a predicted degree of consumption of spare storage space in access operations to be performed for file system 120. The access operations to be performed for file system 120 may include various I/O operations, including reading, writing, overwriting, deletion, and the like. Among these pending access operations, access operations to be performed to which spare storage space is to be allocated include write operations that are to write data to new spare storage space. Overwriting operations involve modification of data stored in the allocated AUs, while operations such as reading and deletion do not consume the spare storage space, either.

In some embodiments, the predicted degree of consumption of spare storage space can be measured by a new write ratio (NWR) of the total number (sometimes referred to as a "third number") of access operations to be performed for file system 120 to the number (sometimes referred to as a "fourth number") of access operations to which spare storage space is to be allocated for writing data among the operations to be performed. For example, the new write ratio NWR can be determined as follows:

$$NWR = \frac{\text{Number of pending access operations to which spare storage space is to be allocated for writing data}}{\text{Total number of access operations to be performed}} \quad (3)$$

In some embodiments, the pending access operations for file system 120 may include pending access operations to be executed in the I/O buffer of file system 120. With the new write ratio NWR, the proportion of the pending access operations to which spare storage space is to be allocated in all the pending access operations can be determined. This can reflect the actual I/O behavior of file system 120 and the degree of consumption of spare storage space.

By considering the new write ratio NWR, the degree of future demand for spare storage space by file system 120 can be estimated based on the current degree of consumption of spare storage space by file system 120. For example, in some application scenarios, most access operations to the file system are modifications of existing data, i.e., overwrite operations to previously allocated AUs. In this case, although access operations to the file system are frequent, for example, the number of I/O operations per unit time (e.g., IOPS) being high, the file system has a low demand for spare storage space. Compared with IOPS or I/O bandwidth, the new write ratio NWR can better reflect the degree of consumption of spare storage space in terms of I/O performance. By predicting the degree of consumption of spare storage space by file system 120, it is possible to better determine whether to allocate more storage space for file system 120.

It should be understood that, in addition to the new write ratio NWR or alternatively, other information related to access behaviors for file system 120, such as IOPS and I/O loans, can be used to predict the predicted degree of consumption of spare storage space by file system 120.

Examples of spare degrees and access characteristics for subsequent determination of a provision operation for file system 120 have been discussed above. In other embodiments, other information related to the spare storage space of, the storage space that has been allocated for storing data in, and access operations to file system 120 can also be used to determine a provision operation for file system 120. In some embodiments, storage management system 110 can collect the spare degree and access characteristics related to file system 120 when an adjustment to the provision operation for file system 120 is triggered.

Still referring back to method 200, at block 220, storage management system 110 uses the provision operation classification model to determine a target storage provision operation to be performed for file system 120 from multiple storage provision operations based on the determined spare degree and access characteristics.

The multiple storage provision operations include at least a storage space expansion operation and a storage space reclamation operation. A storage space expansion operation means allocating more physical storage space (e.g., from storage pool 130) to file system 120 so that the physical storage space of file system 120 is increased. A storage space reclamation operation means deallocating part of the storage space (spare storage space) of the file system, so that the physical storage space of file system 120 is reduced. In some embodiments, the multiple storage provision operations may also include a provision maintenance operation, which refers to maintaining the provision of the current physical storage space for file system 120. That is, in the current state, neither storage space expansion nor storage space reclamation is performed on file system 120.

According to embodiments of the present disclosure, the provision management of the storage space of file system 120 is converted into a classification problem in machine learning by using machine learning techniques, and multiple storage provision operations correspond to multiple classes. The provision operation classification model is trained to characterize an association relationship between different spare degrees and different access characteristics of file system 120 and the multiple storage provision operations. Through the provision operation classification model, it is possible to learn from the training data related to file system 120 which storage provision operation is appropriate under different spare degrees and different access characteristics, thus establishing corresponding association relationships. The training of the provision operation classification model will be discussed in more detail below. In some embodiments, a particular provision operation classification model can be trained for that file system 120 or a certain type of file systems 120.

In some embodiments, when performing classification involving multiple storage provision operations, the constructed provision operation classification model can be configured to map the spare degree and the access characteristics of file system 120 to a score (sometimes referred to as a "target score") within a particular score range, and to determine a target storage provision operation to be performed on file system 120 based on the target score. Specifically, the provision operation classification model can perform the extraction of feature values from the spare degree and the access characteristics of file system 120 and map the feature values to the particular score range.

In some embodiments, the provision operation classification model can predict the target storage provision operation for file system 120 based on a logistic regression model. In some embodiments based on logistic regression models, the provision operation classification model can be configured to perform the mapping of the spare degree and the access characteristics (more specifically, the extracted feature values) of file system 120 to the particular score range using a function having a cumulative distribution characteristic. The function having a cumulative distribution characteristic can provide continuous distribution and progressive increase or progressive decrease characteristics over a value interval.

Examples of the function having a cumulative distribution characteristic include a sigmoid function. The sigmoid function is a function with a characteristic "S" shaped curve. The sigmoid function has many variants. The provision operation classification model will be introduced below using an example sigmoid function.

The provision operation classification model based on the sigmoid function can be expressed as follows:

$$S(z) = \frac{1}{1+e^{-z}} \quad (4)$$

where S represents the output of the provision operation classification model, which is also referred to as a classification label; z represents the feature value extracted from the spare degree and the access characteristics, which can be represented, for example, as $z=w_0x_0+w_1x_1+w_2x_2+ \ldots +w_nx_n$. By means of vector representation, $Z=WX^T$ can be obtained, where $W=[w_0, w_1, w_2, \ldots, w_n]$, and $X=[x_0, x_1, x_2, \ldots, x_n]$.

X or $x_0, x_1, x_2, \ldots, x_n$ refers to n inputs to the provision operation classification model, corresponding to the spare degree and the access characteristics. If the spare degree is indicated by the spare space proportion SSP and the access characteristics include the fragmentation ratio FR and the new write ratio NWR, n=3. In other words, the inputs to the provision operation classification model include $x_0$=SSP, $x_1$=FR, and $x_0$=NWR. W or $w_0, w_1, w_2, \ldots, w_n$ represents a parameter set of the provision operation classification model. Through the training process (which will be described below) of the provision operation classification model, the values of this parameter set will be determined.

Figure 4:
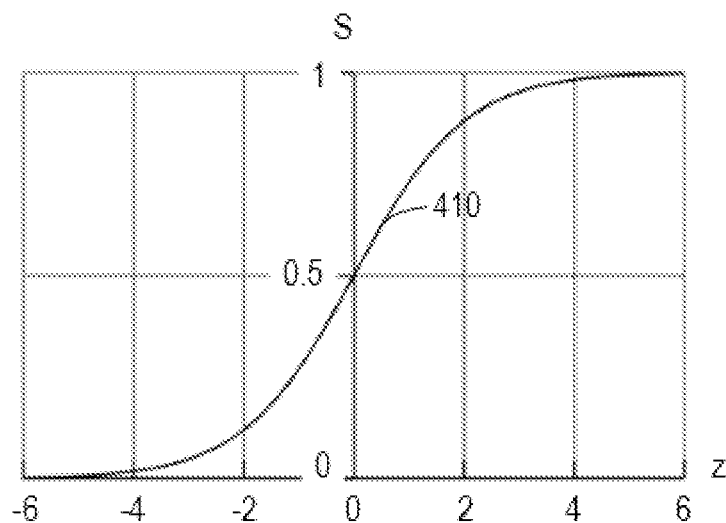
FIG. 4 illustrates an example curve of a function having a cumulative distribution characteristic according to some embodiments of the present disclosure.

FIG. 4 illustrates example curve 410 of a sigmoid function having a cumulative distribution characteristic according to some embodiments of the present disclosure. It can be seen that the sigmoid function has a continuous value interval of [0, 1]. Based on the sigmoid function, the provision operation classification model can map the spare degree and the access characteristics of file system 120 to the score range of [0, 1], i.e., the output S of the provision operation classification model is in the score interval [0, 1]. It should be understood that FIG. 4 is only one example of the output of the provision operation classification model. In other examples, the output of the provision operation classification model may also have other score ranges.

In some embodiments, the scores corresponding to the provision operation classification model may be divided into different score intervals, each score interval being associated with one of the multiple storage provision operations. For example, a first score interval in the score range may be associated with the storage space expansion operation, and a second score interval in the score range may be associated with the storage space reclamation operation. The first score interval and the second score do not overlap with each other, so that the storage space expansion operation and the storage space reclamation operation can be differentiated.

The input to the provision operation classification model includes $x_0$=SSP, $x_1$=FR, and $x_0$=NWR. If SSP, FR, and/or NWR are smaller, it means that file system 120 needs more spare storage space, and therefore, the tendency is more likely to perform the storage space expansion operation. Conversely, if SSP, FR, and/or NWR is larger, it means that the tendency is more likely to perform the storage space expansion operation. In an embodiment in which the output is based on the sigmoid function of Equation (4), if the input SSP, FR, and/or NWR is smaller, the value of output S will be larger; otherwise, the value of output S will be larger.

Based on such value rule, in some embodiments, the first score interval that may be associated with the storage space expansion operation may include a larger score interval in the score range of the provision operation classification model, and the second score interval associated with the storage space reclamation operation may include a smaller score interval. For example, if the score range of the provision operation classification model is [0, 1], the first score interval associated with the storage space expansion operation can be set to [0.56, 1], and the second score interval associated with the storage space reclamation operation can be set to [0, 0.4].

If the target score S output by storage management system 110 using the provision operation classification model falls within the first score interval, for example, S>0.56, storage management system 110 can determine that the storage space expansion operation is to be performed for file system 120. If the target score S falls within the second score interval, for example, S≤0.4, storage management system 110 can determine that the storage space reclamation operation is to be performed for file system 120.

Figure 5:
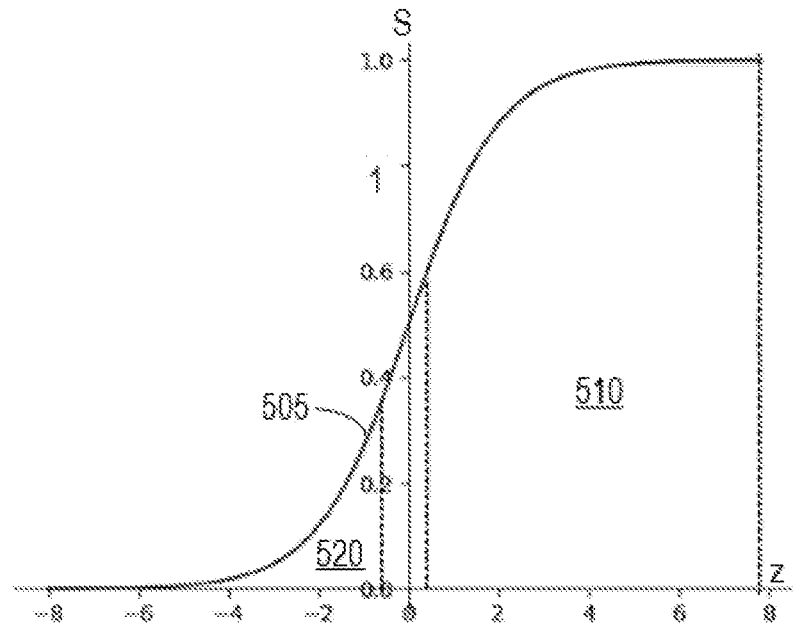
FIG. 5 illustrates an example mapping of classification labels to the score range of a provision operation classification model according to some embodiments of the present disclosure.

FIG. 5 illustrates an example mapping of classification labels to the score range of a provision operation classification model according to some embodiments of the present disclosure. In FIG. 5, the output of the provision operation classification model is represented by curve 705 based on a sigmoid function. Region 510 defined by the value range [0.56, 1] of S corresponds to the storage space expansion operation, and region 520 defined by the value range [0.56, 1] of S corresponds to the storage space reclamation operation.

Note that a gap interval may exist between the first score interval and the second score interval of the score range, for example, a value interval of [0.4, 0.56]. This gap interval is set to prevent the "ping-pong" phenomenon between the storage space expansion operation and the storage space reclamation operation. In some embodiments, the gap interval is associated with a provision maintenance operation to indicate the maintenance of the provision of physical storage space for file system 120. If the target score S output using the provision operation classification model falls within the gap interval, storage management system 110 can determine that the provision maintenance operation is to be performed for file system 120 to maintain the provision of physical storage space for file system 120.

It should be understood that the division of the various score intervals given above is only an example, and other ways of dividing score intervals may exist. In other embodiments, depending on the positively or inversely proportional relationship between the input value size and the output value size of the provision operation classification model, the first score interval associated with the storage space expansion operation may be set to a smaller score interval than the second score interval associated with the storage space reclamation operation.

Still referring back to FIG. 2, at block 230, after determining the target storage provision operation for file system 120 using the provision operation classification model, storage management system 110 performs the determined target storage provision operation, such as the storage space expansion operation or the storage space reclamation operation, for file system 120. If the target storage provision operation is a provision maintenance operation, storage management system 110 can determine that no additional processing of the provision of storage space for file system 120 is required.

The above discusses the use of the provision operation classification model to determine the provision operations for storage space of file system 120. In order to use the provision operation classification model, it is typically necessary to train the provision operation classification model through a training process to determine values of its parameter set, such as the values of W. The training of the provision operation classification model will be discussed below.

Figure 6:
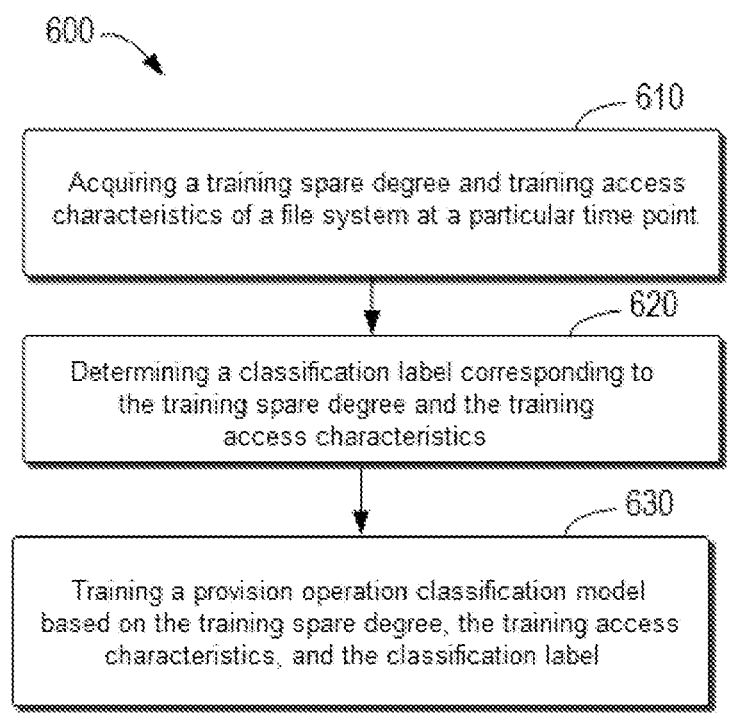
FIG. 6 illustrates a flow chart of a method for training a provision operation classification model according to some embodiments of the present disclosure.

FIG. 6 illustrates a flow chart of method 600 for training a provision operation classification model according to some embodiments of the present disclosure. The training of the provision operation classification model can be performed by storage management system 110 or by other computing systems. By way of example, subsequent embodiments will be described with storage management system 110 performing method 600.

At block 610, storage management system 110 acquires a training spare degree and training access characteristics of file system 120 at a particular time point. The determination of the training spare degree and the training access characteristics is similar to the determination of the spare degree and the access characteristics discussed above. For example, the training spare degree may include the spare space proportion SSP of file system 120 at a certain time point, and the training access characteristics may include the fragmentation ratio FR and/or the new write ratio NWR of file system 120 at a certain time point. Storage management system 110 may collect training spare degrees and training access characteristics from file system 120 over a time period for use in training the provision operation classification model.

At block 620, storage management system 110 determines a classification label corresponding to the training spare degree and the training access characteristics. The classification label indicates that one of the multiple storage provision operations is to be performed for file system 120. The classification label is also used as part of the training data for the provision operation classification model. A parameter directly indicative of a corresponding storage provision operation may not exist for particular spare degrees and access characteristics of file system 120. In some embodiments, storage management system 110 can determine the corresponding classification label according to the utilization situation of storage space of file system 120 within a time period after the particular time point at which the training spare degree and the training access characteristics are collected.

Specifically, within a time period after the particular time point at which the training spare degree and the training access characteristics are collected, storage management system 110 can determine a first size of storage space allocated for storing data and a second size of storage space that is released in the storage space of file system 120, and determine the classification label corresponding to the training spare degree and the training access characteristics based on the first size of storage space and the second size of storage space. In some examples, the first size of storage space can be indicated by the number of AUs allocated for storing data over the observed time period. Similarly, in some examples, the second size of storage space can be indicated by the number of AUs released over the observed time period. In file system 120, the release of the storage space may be due to the deletion or migration of the data stored in it, so that this part of the storage space becomes spare. It should be understood that the first size of storage space allocated for storing data and the second size of storage space that is released can also be measured by other indexes.

In some embodiments, storage management system 110 can determine the classification label corresponding to the training spare degree and the training access characteristics based on a ratio of the first size of storage space to the second size of storage space, especially if the output of the provision operation classification model to be trained is in or normalized to the score range of [0, 1].

The comparison between the first size of storage space and the second size of storage space can indicate whether file system 120 is required to allocate more storage space for data storage due to the execution of I/O operations under the current training spare degree and training access characteristics. In some embodiments, storage management system 110 can determine the classification label based on a ratio of the first size of storage space (denoted as AU1) to the sum (i.e., AU1+AU2) of the first size of storage space and the second size of storage space (denoted as AU2), which can be expressed as follows:

$$S = \text{Classification label} = \frac{AU1}{AU1 + AU2} \quad (5)$$

Based on Equation (5) above, storage management system 110 can determine whether the ratio of the first size of storage space AU1 to the second size of storage space AU2 is greater than a first threshold associated with the storage space expansion operation, and determine the classification label as a first score within the first score interval when AU1/AU2 is greater than the first threshold.

The first threshold can be determined based on the first score interval associated with the storage space expansion operation, e.g., [0.56, 1]. In order to enable the value S of the classification label in Equation (5) to fall within the first score interval, e.g., within [0.56, 1], AU1>1.3*AU2, that is, the ratio of the first size of storage space AU1 to the second size of storage space AU2, AU1/AU2>1.3. Here, 1.3 is the first threshold associated with the storage space expansion operation that is determined based on the first score interval and the score range. Depending on the values of the first score interval and the score range, the first threshold can also be set to other values. For the currently determined AU1 and AU2, the specific score corresponding to the classification label can be directly determined by Equation (5).

In some embodiments, storage management system 110 can determine whether the ratio of the first size of storage space AU1 to the second size of storage space AU2 is smaller than a second threshold associated with the storage space reclamation operation, and determine the classification label as a second score within the second score interval when AU1/AU2 is smaller than the second threshold.

The second threshold can be determined based on the second score interval associated with the storage space expansion operation, e.g., [0, 0.4]. In order to enable the value S of the classification label in Equation (5) to fall within the second score interval, e.g., within [0, 0.4], AU1<0.7*AU2, that is, the ratio of the first size of storage space AU1 to the second size of storage space AU2, AU1/AU2>0.7. Here, 0.7 is the second threshold associated with the storage space expansion operation that is determined based on the second score interval and the score range.

Depending on the values of the second score interval and the score range, the second threshold can also be set to other values. For the currently determined AU1 and AU2, the specific score corresponding to the classification label can be directly determined by Equation (5).

In some embodiments, the first size of storage space AU1 and the second size of storage space AU2 observed over a time period may also have boundary values, which only require special processing to map the scores corresponding to the classification labels to the score range (e.g., the [0, 1] interval) of the provision operation classification model.

In some embodiments, if the first size of storage space AU1 and the second size of storage space AU2 are both zero, it means that from a storage point of view, file system 120 does not have any I/O operations over the observed time period, in which case it is reasonable to keep the storage provision for file system 120. Therefore, the classification label can be directly determined as a third score within the gap interval in the score range, for example, 0.5, or any other score in [0.4, 0.56].

In some embodiments, if the first size of storage space AU1 is zero and the second size of storage space AU2 is not zero, it means that file system 120 has no data write but only data deletion (i.e., storage space release) over the observed time period, in which case the tendency is to perform the storage space reclamation operation on file system 120. Therefore, the classification label can be determined as a fourth score within the second score interval associated with the storage space reclamation operation. For example, the first size of storage space AU1 can be directly set to 1 AU (or another small number), and the score corresponding to the classification label can be determined through Equation (5). In this way, the classification label can be mapped to a valid value within the score range [0, 1].

In some embodiments, if the second size of storage space AU2 is zero and the first size of storage space AU1 is not zero, it means that file system 120 has only data write (i.e., storage space is constantly being allocated) but no data deletion over the observed time period, in which case the tendency is to perform the storage space expansion operation on file system 120. Therefore, the classification label can be determined as a fifth score within the first score interval associated with the storage space expansion operation. For example, the second size of storage space AU2 can be directly set to 1 AU (or another small number), and the score corresponding to the classification label can be determined through Equation (5). In this way, the classification label can be mapped to a valid value within the score range [0, 1].

In some embodiments, since allocation and release of storage space of file system 120 are to be observed over a time period to determine the classification label corresponding to the training spare degree and the training access characteristics, storage management system 110 determines that no expansion or reclamation is to be performed on the physical storage space of the file system over this time period to avoid contamination of the classification label. In some embodiments, it is also possible to collect multiple classification label samples within a long time period after the particular time point at which the training spare degree and the training access characteristics are collected, and to determine a final classification sample by performing averaging of the multiple classification label samples, which may avoid interference from transient abnormal values. The time period for collecting multiple classification label samples each time may be of different lengths. For example, three classification label samples can be determined in short, medium, and long time periods, respectively.

Figure 7:
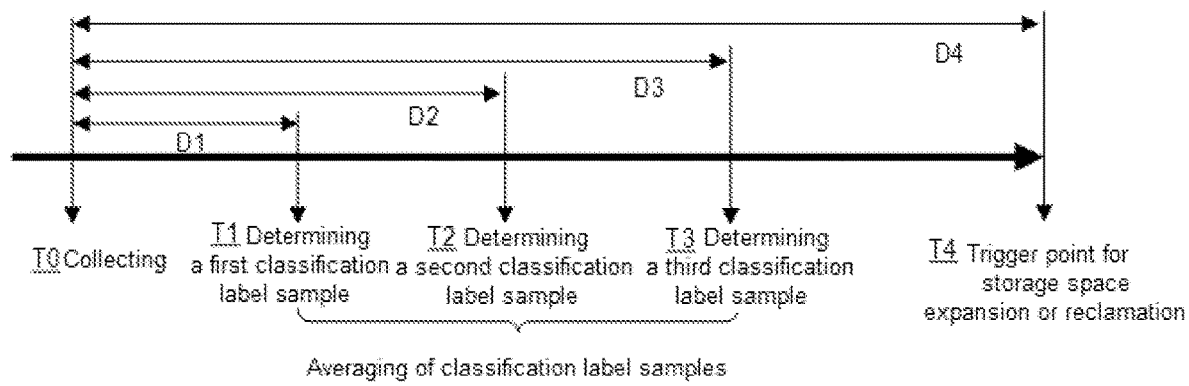
FIG. 7 illustrates an example of the collection of training spare degrees, training access characteristics, and classification labels according to some embodiments of the present disclosure.

FIG. 7 illustrates an example of the collection of training spare degrees, training access characteristics, and classification labels according to some embodiments of the present disclosure. Assume that the training spare degree and the training access characteristics of file system 120 are acquired at time T0. A first classification label sample is determined within time period D1 from T0 to T1. A second classification label sample is determined within time period D2 from T0 to T2. A third classification label sample is determined within time period D3 from T0 to T3. The determination of each classification label sample is similar to the determination of the classification label discussed above.

Each classification label sample corresponds to one score within the score range of the provision operation classification model. Ultimately, multiple scores that fall within the score range can be determined. By performing averaging or weighted averaging on these scores, the classification label corresponding to the training spare degree and the training access characteristics collected at time T0 can be determined.

In some embodiments, the collection of a single classification label or the collection of multiple classification label samples is to be completed prior to a periodic trigger point for expansion or reclamation of storage space of file system 120. For example, in the example of FIG. 7, expansion or reclamation of storage space of file system 120 may be triggered at time point T4. Storage space information needed to determine the classification label is to be collected prior to time point T4. Note that expansion or reclamation of storage space of file system 120 can be performed based on other solutions, e.g., threshold-based algorithms, before the provision operation classification model has been trained. In some embodiments, depending on the length of the trigger cycle for expansion or reclamation of storage space of file system 120, one or more collections of the training spare degree and the training access characteristics as well as the corresponding classification label can be performed in a single cycle.

At block 630, storage management system 110 trains the provision operation classification model based on the training spare degree, the training access characteristics, and the classification label. Various algorithms suitable for machine learning can be used to perform model training to determine values of the parameter set W of the provision operation classification model. In the training process, (training spare degree, training access characteristics) and (classification label) constitute one training sample. In this training sample, (training spare degree, training access characteristics) is used as the training input to the provision operation classification model, and the classification label is used as the target output corresponding to this training input. In some embodiments, in order to train the provision operation classification model to a convergence target, storage management system 110 can collect multiple training samples consisting of (training spare degree, training access characteristics) and (classification label).

By way of example only, in some implementations, a gradient ascent method can be used as the training algorithm to determine the optimal values of the parameter set W of the provision operation classification model. This training algorithm can be simplified into the following pseudo code:

```
Training algorithm (X, S):
    alpha = 0.001

W = ⎡[1]⎤
        ⎢[1]⎥
        ⎣[1]⎦

Iterate for the maximum number of times, or until error < T:
        H = sigmoid (X * W)
        error = S - H
        W = W + alpha * X^T * error   (1)
    Return W
```

The parameters in the parameter set W can be initialized to 1 or other values. According to the above training algorithm, the sigmoid function is used to process the input X in each training sample based on the current values of the parameter set W to calculate classifier label H, and generate a difference between classifier label S in the training sample and output result H of the sigmoid function. By adjusting the values of the parameter set W using the error in the above Equation (1), the adjusted values of the parameter set W are obtained. In the above Equation (1), alpha represents the learning rate, which can be a predetermined value. The aforementioned adjustment process can be iterated a predetermined maximum number of times or iterated until the error is less than a predetermined threshold T, so as to reach the convergence target and complete the model training. The values of the parameter set W determined after convergence are used as the optimal parameter values for the trained provision operation classification model.

In some cases, the performance of such storage management solution can also be evaluated after the provision operation classification model is used in file system 120 to manage the provision of storage space. As discussed above, for file systems with dynamic storage space allocation, particularly those based on thin provision storage configurations, the concern is how to balance storage space effectiveness and I/O performance. In some embodiments, reasonable storage space provision can often lead to higher I/O performance earnings. If too much spare storage space is allocated to file system 120, I/O performance earnings will be degraded.

In some embodiments, after the provision operation classification model is used in file system 120 to manage the provision of storage space, for example, after applying the one or more target storage provision operations determined by the provision operation classification model, the utilization per spare storage space (IO earnings per spare space, IOEPS) of file system 120 can be determined for measuring the performance of the trained provision operation classification model. The IOEPS indicates the proportion of the increase in the access amount over a time period to the increase amount of spare storage space over that time period.

When determining the IOEPS, storage management system 110 can determine the increase amount of spare storage space in file system 120 over a time period, and determine the access capacity of file system 120 over that time period. The access capacity can be determined by the product of the average I/O bandwidth over that time period and the duration of that time period. The IOEPS can be determined based on a ratio of the access amount to the increase amount. For example, the IOEPS can be determined as:

$$IOEPS = \frac{Average\ I/O\ bandwith * Time\ period}{Increase\ amount\ of\ spare\ storage\ space} \quad (6)$$

The IOEPS indicates how much I/O earnings can be achieved per spare storage space during the observed time period. The larger the IOEPS is, the more I/O earnings can be obtained per spare storage space, and so the better the storage provision solution is.

Figure 8:
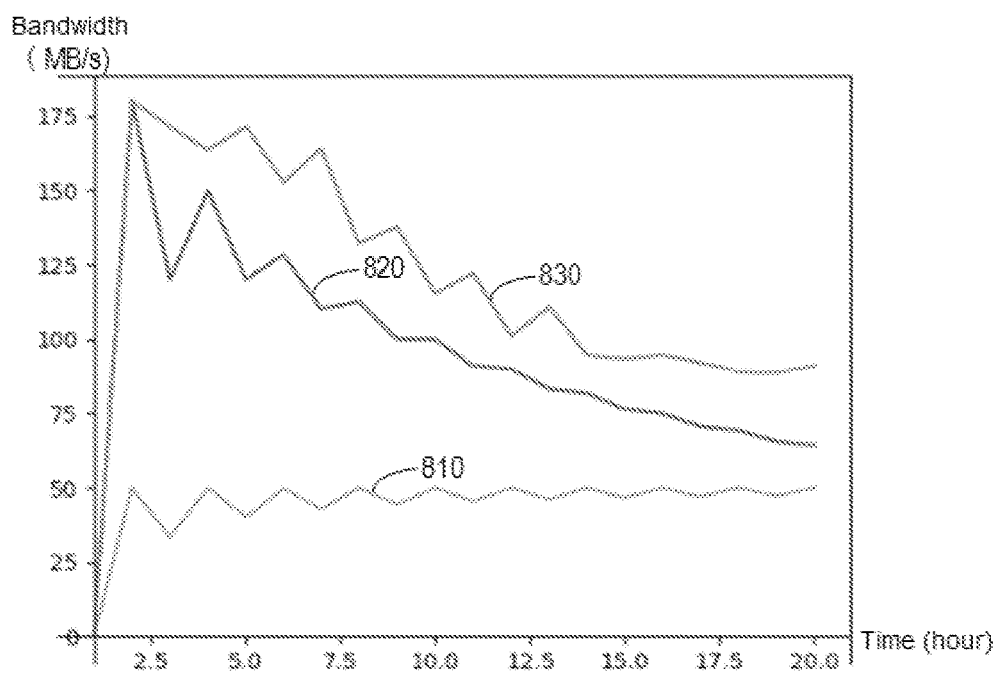
FIG. 8 illustrates a comparison of performance between storage provision according to some embodiments of the present disclosure and storage provision based on conventional solutions.

FIG. 8 illustrates a comparison of performance between storage provision according to some embodiments of the present disclosure and storage provision based on conventional solutions. In FIG. 8, the performance of a file system based on different storage provision solutions is represented by the IOEPS. In FIG. 8, curve 810 indicates the average I/O bandwidth of the file system. Curve 820 indicates the change of IOEPS over time as determined in a file system using conventional storage provision (i.e., threshold-based storage provision), and curve 830 indicates the change of IOEPS over time as determined in a file system with storage provision according to example embodiments of the present disclosure (i.e., threshold-based storage provision).

In the comparison shown in FIG. 8, it is assumed that the I/O bandwidth of the file system in both solutions is set to the bandwidth shown in curve 810 and that the I/O behavior of the file system is controlled in the following pattern: suspending the I/O operation for 30 minutes after every 30 minutes of random write operations. It can be seen that the storage provision according to example embodiments of the present disclosure is able to obtain a higher IOEPS, and thus has better performance.

In some embodiments, the provision operation classification model determined for certain file system 120 can also be continuously updated as file system 120 exhibits changes in spare storage space usage and access characteristics due to the needs of user usage. For example, certain file system 120 may originally have been used by the user primarily to store archived data, so write operations are not frequent. However, the user may use this file system 120 as an active database based on usage needs and will frequently write data to file system 120. In this case, the provision operation classification model originally trained for this file system 120 may no longer be suitable for the current application scenario and may not provide an accurate prediction about expansion or reclamation of the storage space.

Therefore, it is expected that the provision operation classification model can be re-trained to further learn new association relationships between different spare degrees and different access characteristics of file system 120 and multiple storage provision operations. In some embodiments, storage management system 110 can periodically, or based on specific events, determine whether to trigger re-training of the provision operation classification model. For example, storage management system 110 can determine an error rate of the provision operation classification model, and/or determine the IOEPS of file system 120, so as to determine whether to re-train the provision operation classification model.

In some embodiments, if it is determined that the error rate of the model is high, for example, exceeding a threshold error rate, which means that the performance of the currently trained provision operation classification model is not satisfactory, the provision operation classification model can be re-trained. Alternatively or additionally, if it is determined that the IOEPS has a downtrend relative to the previous IOEPS, that is, multiple IOEPSs determined over a time period show a downtrend, it can be determined that the provision operation classification model cannot adapt well to current file system 120 and cannot achieve unsatisfactory performance. In this case, it can also be determined that the provision operation classification model is to be re-trained.

In some embodiments, the storage space provision for file system 120 can be managed based on conventional threshold-based algorithms during training or re-training of the provision operation classification model for file system 120.

Figure 9:
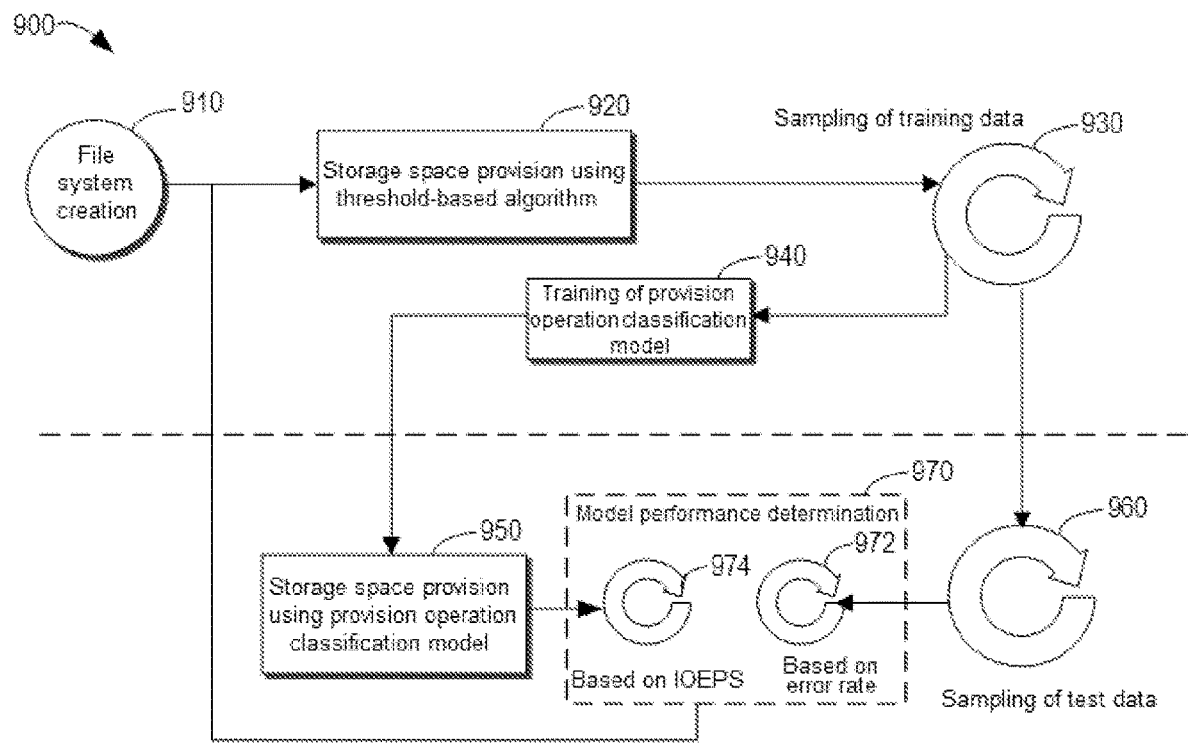
FIG. 9 illustrates an example flow chart of storage provision for a file system according to some embodiments of the present disclosure.

FIG. 9 illustrates example flow chart 900 of storage provision for a file system according to some embodiments of the present disclosure. This process can be implemented by storage management system 110, or one or more phases therein can be implemented by other computing systems. For example, the training or updating of the model can be implemented by other computing systems.

In flow chart 900, at phase 910, storage management system 110 creates file system 120. At phase 920, storage management system 110 uses a threshold-based algorithm to manage the storage space provision for file system 120. In this process, the sampling of training data is also performed at phase 930. After sufficient training data has been collected, the provision operation classification model is trained at phase 940 using the collected training data. The trained provision operation classification model is provided to phase 950 to perform storage space provision for file system 120 using the provision operation classification model.

Upon completion of training of the provision operation classification model, at phase 960, a portion of the collected training data can also be determined as test data for testing the error rate of the provision operation classification model. Alternatively or additionally, during use of the provision operation classification model, the IOEPS demonstrated by file system 120 after file system 120 determines the storage provision operation using the provision operation classification model can be observed and determined.

Flow chart 900 also includes phase 970 of model performance determination. This phase may include first sub-phase 972 and/or second sub-phase 974. At first sub-phase 972, the performance of the provision operation classification model can be determined by the error rate of the provision operation classification model. At second sub-phase 974, the performance of the provision operation classification model can be determined by the IOEPS determined for file system 120.

In some embodiments, if it is determined at first sub-phase 972 that the error rate of the model is high, for example, exceeding the threshold error rate, which means that the performance of the currently trained provision operation classification model is not satisfactory, the provision operation classification model can be re-trained. Alternatively or additionally, if it is determined at second sub-phase 974 that the IOEPS has a downtrend relative to the previous IOEPS, it can be determined that the provision operation classification model cannot adapt well to current file system 120 and cannot achieve unsatisfactory performance. In this case, it can also be determined that the provision operation classification model is to be re-trained. In some embodiments, multiple IOEPSs can be determined multiple times over a time period and the degree of change, such as gradient, in those IOEPSs can be determined. If the IOEPSs show a downtrend over a time period, it may be determined that the provision operation classification model is to be re-trained.

In some embodiments, re-training of the provision operation classification model can be performed only after it is determined that the provision operation classification model is to be re-trained at both first sub-phase 972 and second phase 974.

If it is determined that the provision operation classification model is to be re-trained, storage management system 110 can return to phase 920 to enable the threshold-based algorithm to manage the storage space provision for file system 120. Flow chart 900 can be executed cyclically during the operation of file system 120.

Figure 10:
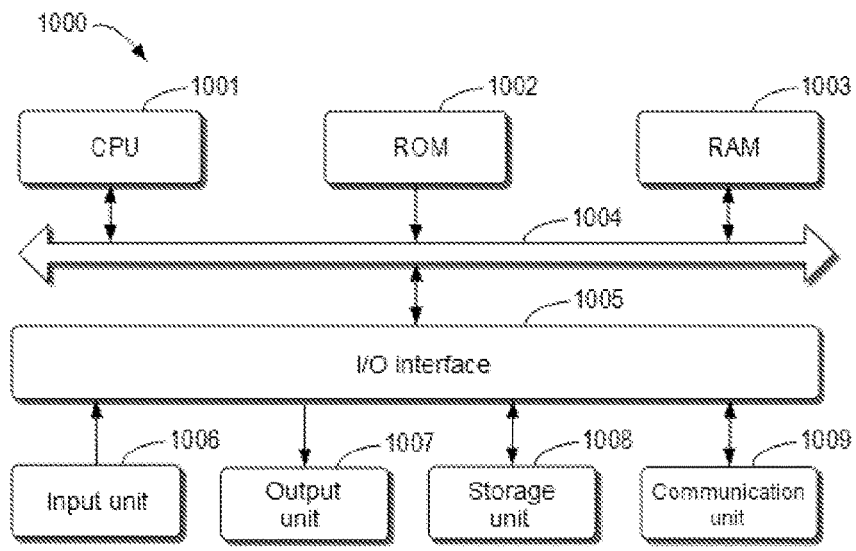
FIG. 10 illustrates a schematic block diagram of a device that can be used to implement embodiments of the present disclosure.

FIG. 10 schematically illustrates a block diagram of device 1000 that can be used to implement the embodiments of the present disclosure. Storage management system 110 can be implemented as device 1000, for example, or to include one or more devices 1000.

As shown in FIG. 10, device 1000 includes central processing unit (CPU) 1001 that may perform various appropriate actions and processing according to computer program instructions stored in read-only memory device (ROM) 1002 or computer program instructions loaded from storage unit 1008 into random access memory device (RAM) 1003. In RAM 1003, various programs and data required for the operation of device 1000 may also be stored. CPU 1001, ROM 1002, and RAM 1003 are connected to one another through bus 1004. Input/output (I/O) interface 1005 is also connected to bus 1004.

Multiple components in device 1000 are connected to I/O interface 1005, including: input unit 1006, such as a keyboard and a mouse; output unit 1007, such as various types of displays and speakers; storage unit 1008, such as a magnetic disk and an optical disk; and communication unit 1009, such as a network card, a modem, and a wireless communication transceiver. Communication unit 1009 allows device 1000 to exchange information/data with other devices via a computer network such as the Internet and/or various telecommunication networks.

The various processes and processing described above, for example, method 200, method 600, and/or process 900, can be performed by processing unit 1001. For example, in some embodiments, method 200, method 600, and/or process 900 can be implemented as a computer software program that is tangibly included in a machine-readable medium, for example, storage unit 1008. In some embodiments, part or all of the computer program may be loaded and/or installed to device 1000 via ROM 1002 and/or communication unit 1009. When the computer program is loaded to RAM 1003 and executed by CPU 1001, one or more steps of method 200, method 600, and/or process 900 described above can be performed.

As used herein, the term "include" and similar terms thereof should be understood as open-ended inclusion, i.e., "including but not limited to." The term "based on" should be understood as "based at least in part on." The term "one embodiment" or "the embodiment" should be understood as "at least one embodiment." The terms "first," "second," and the like may refer to different or identical objects. Other explicit and implicit definitions may also be included below.

As used herein, the term "determine" encompasses a variety of actions. For example, "determine" may include operating, computing, processing, exporting, surveying, searching (for example, searching in a table, a database, or another data structure), identifying, and the like. In addition, "determine" may include receiving (for example, receiving information), accessing (for example, accessing data in a memory), and the like. In addition, "determine" may include parsing, selecting, choosing, establishing, and the like.

It should be noted that the embodiments of the present disclosure may be implemented by hardware, software, or a combination of software and hardware. The hardware part can be implemented using dedicated logic; the software part can be stored in a memory and executed by an appropriate instruction execution system, such as a microprocessor or dedicated design hardware. Those skilled in the art can understand that the above-mentioned devices and methods can be implemented by using computer- executable instructions and/or by being included in processor control code which, for example, is provided on a programmable memory or a data carrier such as an optical or electronic signal carrier.

In addition, although the operations of the method of the present disclosure are described in a specific order in the drawings, this does not require or imply that these operations must be performed in the specific order, or that all the operations shown must be performed to achieve the desired result. Rather, the order of execution of the steps depicted in the flow charts can be changed. Additionally or alternatively, some steps may be omitted, multiple steps may be combined into one step for execution, and/or one step may be decomposed into multiple steps for execution. It should also be noted that the features and functions of two or more apparatuses according to the present disclosure may be embodied in one apparatus. On the contrary, the features and functions of one apparatus described above can be embodied by further dividing the apparatus into multiple apparatuses.

Although the present disclosure has been described with reference to several specific embodiments, it should be understood that the present disclosure is not limited to the specific embodiments disclosed. The present disclosure is intended to cover various modifications and equivalent arrangements included within the spirit and scope of the appended claims.

The invention claimed is:

1. A method for storage management, comprising:
determining a spare degree of physical storage space of a file system and access characteristics of the file system;
determining, using a provision operation classification model and based on the spare degree and the access characteristics, a target storage provision operation to be performed for the file system from multiple storage provision operations, wherein the multiple storage provision operations include at least a storage space expansion operation and a storage space reclamation operation, and the provision operation classification model characterizes an association relationship between different spare degrees and different access characteristics of the file system and the multiple storage provision operations; and
performing the determined target storage provision operation for the file system;
acquiring a training spare degree and training access characteristics of the file system at a particular time point;
determining a classification label corresponding to the training spare degree and the training access characteristics, wherein the classification label indicates that one of the multiple storage provision operations is to be performed on the file system; and
training the provision operation classification model based on the training spare degree, the training access characteristics, and the classification label.

2. The method according to claim 1, wherein determining the access characteristics includes determining at least one of the following:
a sequential write capability of the file system; and
a predicted degree of consumption of spare storage space in access operations to be performed for the file system.

3. The method according to claim 2, wherein determining the sequential write capability includes:
determining a first number of storage units in the physical storage space of the file system that are used for sequential writing;
determining a second number of storage units in which data is partially written among the storage units of the file system that are used for sequential writing; and
determining the sequential write capability based on a ratio of the second number to the first number.

4. The method according to claim 2, wherein determining a predicted degree of consumption of spare storage space includes:
determining a third number of access operations to be performed;
determining a fourth number of pending access operations to which spare storage space is to be allocated for writing data; and
determining the predicted degree of consumption of spare storage space based on a ratio of the fourth number to the third number.

5. The method according to claim 1, wherein determining a target storage provision operation to be performed includes:
mapping the spare degree and the access characteristics to a target score within a score range using the provision operation classification model;
determining that the storage space expansion operation is to be performed for the file system if the target score falls within a first score interval associated with the storage space expansion operation in the score range; and
determining that the storage space reclamation operation is to be performed for the file system if the target score falls within a second score interval associated with the storage space reclamation operation in the score range.

6. The method according to claim 5, wherein the score range further includes a gap interval not within the first score interval and the second score interval, and the multiple storage provision operations further include a provision maintenance operation, and wherein determining a target storage provision operation to be performed further includes:
determining, if it is determined that the target score is in the gap interval, that the provision maintenance operation is to be performed for the file system to maintain provision of the physical storage space of the file system.

7. The method according to claim 5, wherein the provision operation classification model is based on a function having a cumulative distribution characteristic.

8. The method according to claim 1, wherein determining the classification label includes:
determining, within a time period after the particular time point, a first size of storage space that is allocated for storing data and a second size of storage space that is released in the storage space of the file system; and
determining the classification label based on the first size of storage space and the second size of storage space.

9. The method according to claim 8, wherein the provision operation classification model maps the spare degree and the access characteristics to a target score within a score range, the score range including a first score interval associated with the storage space expansion operation and a second score interval associated with the storage space reclamation operation, and determining the classification label includes:
determining the classification label as a first score within the first score interval if a ratio of the first size of storage space to the second size of storage space is greater than a first threshold associated with the storage space expansion operation; and determining the classification label as a second score within the second score interval if the ratio of the first size of storage space to the second size of storage space is less than a second threshold associated with the storage space reclamation operation.

10. The method according to claim 9, wherein the score range further includes a gap interval not within the first score interval and the second score interval, and determining the classification label further includes:
    determining the classification label as a third score within the gap interval if the first size of storage space and the second size of storage space are both zero;
    determining the classification label as a fourth score within the second score interval if the first size of storage space is zero; and
    determining the classification label as a fifth score within the first score interval if the second size of storage space is zero.

11. The method according to claim 9, wherein the physical storage space of the file system is not expanded or reclaimed during the time period.

12. The method according to claim 1, further comprising:
    determining at least one of an error rate of the provision operation classification model and a utilization per spare storage space of the file system after the target storage provision operation is performed; and
    determining re-training of the provision operation classification model based on the determined at least one of the error rate and the utilization per spare storage space.

13. The method according to claim 12, wherein determining the utilization per spare storage space includes:
    determining an increase amount of spare storage space in the file system over a time period;
    determining an access capacity of the file system over the time period; and
    determining the utilization per spare storage space based on a ratio of the access amount to the increase amount.

14. The method according to claim 12, wherein determining re- training of the provision operation classification model includes:
    determining that re-training is to be performed on the provision operation classification model if at least one of the following is determined:
    the error rate exceeds a threshold error rate, or
    the utilization per spare storage space has a downtrend relative to a previous utilization per spare storage space of the file system.

15. The method according to claim 1, further comprising:
    averaging multiple classification labels corresponding to different time points, including the determined classification label, to obtain an averaged classification label;
    wherein training the provision operation classification model is further based on the averaged classification model.

16. The method according to claim 1, wherein the classification model indicates a target result corresponding to the training spare degree and the training access characteristics;
    wherein training the provision operation classification model includes:
        generating an output classification label using the provision operation classification model and corresponding to the training spare degree and the training access characteristics;
        calculating an error amount based on the target result and the output classification label;
        adjusting parameters of the provision operation classification model based on the error amount.

17. An electronic device, comprising:
    at least one processor; and
    at least one memory storing computer program instructions, wherein the at least one memory and the computer program instructions are configured to cause, together with the at least one processor, the electronic device to perform actions including:
        determining a spare degree of physical storage space of a file system and access characteristics of the file system;
        determining, using a provision operation classification model and based on the spare degree and the access characteristics, a target storage provision operation to be performed for the file system from multiple storage provision operations, wherein the multiple storage provision operations include at least a storage space expansion operation and a storage space reclamation operation, and the provision operation classification model characterizes an association relationship between different spare degrees and different access characteristics of the file system and the multiple storage provision operations; and
        performing the determined target storage provision operation for the file system;
        acquiring a training spare degree and training access characteristics of the file system at a particular time point;
        determining a classification label corresponding to the training spare degree and the training access characteristics, wherein the classification label indicates that one of the multiple storage provision operations is to be performed on the file system; and
        training the provision operation classification model based on the training spare degree, the training access characteristics, and the classification label.

18. The device according to claim 17, wherein determining the access characteristics includes determining at least one of the following:
    a sequential write capability of the file system; and
    a predicted degree of consumption of spare storage space in access operations to be performed for the file system.

19. The device according to claim 18, wherein determining the sequential write capability includes:
    determining a first number of storage units in the physical storage space of the file system that are used for sequential writing;
    determining a second number of storage units in which data is partially written among the storage units of the file system that are used for sequential writing; and
    determining the sequential write capability based on a ratio of the second number to the first number.

20. The device according to claim 18, wherein determining a predicted degree of consumption of spare storage space includes:
    determining a third number of access operations to be performed;
    determining a fourth number of pending access operations to which spare storage space is to be allocated for writing data; and
    determining the predicted degree of consumption of spare storage space based on a ratio of the fourth number to the third number.

21. The device according to claim 17, wherein determining a target storage provision operation to be performed includes:

mapping the spare degree and the access characteristics to a target score within a score range using the provision operation classification model;

determining that the storage space expansion operation is to be performed for the file system if the target score falls within a first score interval associated with the storage space expansion operation in the score range; and determining that the storage space reclamation operation is to be performed for the file system if the target score falls within a second score interval associated with the storage space reclamation operation in the score range.

22. The device according to claim 21, wherein the score range further includes a gap interval not within the first score interval and the second score interval, and the multiple storage provision operations further include a provision maintenance operation, and wherein determining a target storage provision operation to be performed further includes:

determining, if it is determined that the target score is in the gap interval, that the provision maintenance operation is to be performed for the file system to maintain provision of the physical storage space of the file system.

23. The device according to claim 21, wherein the provision operation classification model is based on a function having a cumulative distribution characteristic.

24. The device according to claim 17, wherein determining the classification label includes:

determining, within a time period after the particular time point, a first size of storage space that is allocated for storing data and a second size of storage space that is released in the storage space of the file system; and determining the classification label based on the first size of storage space and the second size of storage space.

25. The device according to claim 24, wherein the provision operation classification model maps the spare degree and the access characteristics to a target score within a score range, the score range including a first score interval associated with the storage space expansion operation and a second score interval associated with the storage space reclamation operation, and determining the classification label includes:

determining the classification label as a first score within the first score interval if a ratio of the first size of storage space to the second size of storage space is greater than a first threshold associated with the storage space expansion operation; and determining the classification label as a second score within the second score interval if the ratio of the first size of storage space to the second size of storage space is less than a second threshold associated with the storage space reclamation operation.

26. The device according to claim 25, wherein the score range further includes a gap interval not within the first score interval and the second score interval, and determining the classification label further includes:

determining the classification label as a third score within the gap interval if the first size of storage space and the second size of storage space are both zero;

determining the classification label as a fourth score within the second score interval if the first size of storage space is zero; and determining the classification label as a fifth score within the first score interval if the second size of storage space is zero.

27. The device according to claim 25, wherein the physical storage space of the file system is not expanded or reclaimed during the time period.

28. The device according to claim 17, wherein the actions further include:

determining at least one of an error rate of the provision operation classification model and a utilization per spare storage space of the file system after the target storage provision operation is performed; and determining re-training of the provision operation classification model based on the determined at least one of the error rate and the utilization.

29. The device according to claim 28, wherein determining the utilization per spare storage space includes:

determining an increase amount of spare storage space in the file system over a time period;

determining an access capacity of the file system over the time period; and determining the utilization per spare storage space based on a ratio of the access amount to the increase amount.

30. The device according to claim 28, wherein determining re- training of the provision operation classification model includes:

determining that re-training is to be performed on the provision operation classification model if at least one of the following is determined:

the error rate exceeds a threshold error rate, or the utilization per spare storage space has a downtrend relative to a previous utilization per spare storage space of the file system.

31. A computer program product having a non-transitory computer readable medium which stores a set of instructions to perform storage management; the set of instructions, when carried out by computerized circuitry, causing the computerized circuitry to perform a method of:

determining a spare degree of physical storage space of a file system and access characteristics of the file system;

determining, using a provision operation classification model and based on the spare degree and the access characteristics, a target storage provision operation to be performed for the file system from multiple storage provision operations, wherein the multiple storage provision operations include at least a storage space expansion operation and a storage space reclamation operation, and the provision operation classification model characterizes an association relationship between different spare degrees and different access characteristics of the file system and the multiple storage provision operations; and performing the determined target storage provision operation for the file system;

acquiring a training spare degree and training access characteristics of the file system at a particular time point;

determining a classification label corresponding to the training spare degree and the training access characteristics, wherein the classification label indicates that one of the multiple storage provision operations is to be performed on the file system; and training the provision operation classification model based on the training spare degree, the training access characteristics, and the classification label.

* * * * *